United States Patent
Maxwell et al.

(10) Patent No.: US 7,028,086 B2
(45) Date of Patent: Apr. 11, 2006

(54) APPARATUS, METHOD, AND COMPUTER PROGRAM FOR DETECTION OF SERVER-LIKE DEVICES ON A COMPUTER NETWORK BASED ON INGRESS TO EGRESS NETWORK TRAFFIC RATIOS

(75) Inventors: David John Maxwell, Edinburgh (GB); Paul Sandie, Edinburgh (GB); Jonathan G. G. Tams, Edinburgh (GB); Stephen Kitt, Edinburgh (GB); Neil E Harrison, Fife (GB)

(73) Assignee: 3Com Corporation, Marlborough, MA (US)

( * ) Notice: Subject to any disclaimer, the term of this patent is extended or adjusted under 35 U.S.C. 154(b) by 633 days.

(21) Appl. No.: 09/934,984

(22) Filed: Aug. 22, 2001

(65) Prior Publication Data

US 2002/0174221 A1 Nov. 21, 2002

(30) Foreign Application Priority Data

Mar. 30, 2001 (GB) .................................... 0108057

(51) Int. Cl.
*G06F 15/173* (2006.01)
(52) U.S. Cl. ........................................ 709/224; 370/254
(58) Field of Classification Search ................ 709/224; 370/254

See application file for complete search history.

(56) References Cited

U.S. PATENT DOCUMENTS

| 5,712,981 | A | * | 1/1998 | McKee et al. ............... 709/241 |
| 5,926,462 | A | * | 7/1999 | Schenkel et al. ........... 370/254 |
| 5,933,416 | A |  | 8/1999 | Schenkel et al. ........... 370/254 |
| 2003/0147353 | A1 | * | 8/2003 | Clarkson et al. ............ 370/252 |

OTHER PUBLICATIONS

McCloghrie et al., "Management Information Base For Network Management Of TCP/IP-Based Internets: MIB-II", RFC 1213, Mar. 1991, pp. 1-70.

* cited by examiner

Primary Examiner—Krisna Lim
Assistant Examiner—Philip S. Scuderi
(74) Attorney, Agent, or Firm—McDonnell Boehnen Hulbert & Berghoff LLP

(57) ABSTRACT

Ingress to egress network traffic ratios are determined for at least some devices within a network and server-like devices are selected on the basis of the determined ratios or a figure derived from the determined ratios. Selecting the server-like devices includes the step of selecting those devices having a value of ratio above a selected value and includes ranking the devices in order of their ratios and determining discontinuities in the values of the ratios of the ranked devices. The server-like devices are connected to a port of another device and the ingress to egress network traffic ratio is determined by determining the network traffic through the port using SNMP.

19 Claims, 4 Drawing Sheets

APPARATUS, METHOD, AND COMPUTER PROGRAM FOR DETECTION OF SERVER-LIKE DEVICES ON A COMPUTER NETWORK BASED ON INGRESS TO EGRESS NETWORK TRAFFIC RATIOS

BACKGROUND OF THE INVENTION

The present invention relates generally to the process of discovery (and usually) display of devices on a network, that is a network of electronic devices comprising, for example, workstations, personal computers, servers, hubs, routers, bridges, switches, (hereinafter referred to as devices of the network), and links between these devices which may be in the form of physical cable or wireless links. The network may be a local area network (LAN), such as an Ethernet network, wide area network (WAN) or other types, including wireless networks, and may operate in accordance with any desired protocol.

Computers and other devices connected to a network may be managed or unmanaged devices. A managed device has processing capability which enables it to monitor data traffic sent from, received at, and passing through the ports of the device. Monitored data associated with the ports of the network device is stored in memory on the network device. For example, data relating to the origin of a data packet which is received at a port is stored along with the identify of the relevant port.

After such a network has been installed, it is desirable for the person appointed network manager to be able to understand the technical operation of the network. In known network management systems, relevant data is retrieved from the managed devices, compiled and displayed ("discovered").

The topology of the network may be deduced by operation of the network manager's computer by the process of discovery in which each of the devices of the network are interrogated to thereby produce on a network manager's workstation details of the network and its operation, preferably in the form of a network map which may be displayed on a visual display unit showing the devices and links between the devices. At its simplest, and where the device is a "managed" device, this information is usually provided by interrogation using a known protocol, such as, but not limited to, the SNMP (Simple Network Management Protocol), of the so-called 'agent' of each device which stores the device's unique MAC address, the type of device and the MAC addresses embedded in the data passing into a particular port which thereby gives the MAC addresses of the origin of the data and hence the MAC address of the devices which are connected to the ports directly or indirectly.

The present invention relates in particular to the discovery and preferably the automated detection of the servers or server like devices in the network.

In some circumstances the interrogation of the agent of each device does not necessarily provide sufficient information to identify it as a server-like device which may simply be a computer carrying particular software. In fact, the network manager normally manually inserts the information that a particular device (computer) on the network is a server or server like device.

Hitherto attempts have been made to automatically identify servers by identifying the operating system a device is running but this can lead to misidentifications. Manual entry of known servers requires end user knowledge of which are the servers within the network which becomes impossible when the network is large.

SUMMARY OF THE INVENTION

The invention provides a procedure whereby server-like devices within a network may be automatically detected, for example via SNMP, by analyzing their network traffic profiles. The invention is based on the realization that the traffic profiles of servers and server like devices will be very different from other devices.

The method avoids the laborious manual entry of known servers within network management applications, and also reduces the knowledge required of the network manager with regards to which devices within the network are servers.

According to a first aspect, the present invention provides method for detection of server-like devices within a network, said detection method comprising the steps of
  determining the ingress to egress network traffic for at least some of the devices,
  and selecting the server-like devices on the basis of said determined ratios or a figure derived from said determined ratios.

Preferably each server-like device is connected to a port of another device and the ingress to egress network traffic ratio is determined by determining the network traffic through said port, preferably using SNMP.

The step of selecting the server-like devices preferably includes selecting those devices having a value of said determined ratio above a selected value. There may be provided a step of ranking the devices in order of their determined ratios.

The selection of the server-like devices may include determining discontinuities in the values of the determined ratios of the ranked devices.

There may be provided a step of nominally plotting the determined ratios of the devices against the ranked devices and deriving the second derivative of the graph, and using the second derivative to select the server-like devices.

There may be provided a step of nominally plotting the determined ratios of the devices against the ranked devices and deriving the third derivative of the graph, and using the second and third derivatives to select the server-like devices. Preferably the second and third derivatives are used to divide the devices into groups and select one or more of the groups of devices as server-like devices.

The devices may be divided into groups by determining the boundaries of the groups as points where the second derivative is zero and the third derivative is less than zero.

There may be provided a step of selecting one or more of the groups of devices as server-like devices by selecting one of said points as a cut-off point beyond which all devices are considered as exhibiting server-like behaviour.

The invention may also provide a computer program on a computer readable medium loadable into a digital computer, or embodied in a carrier wave, said computer program comprising software for performing the steps of any of the preceding statements of invention.

According to a second aspect, the present invention provides a computer program on a computer readable medium loadable into a digital computer, or embodied in a carrier wave, said computer program comprising the following steps;
  first program step; Start
  second program step; Retrieve ifInOctets and ifOutOctets counter values from all devices by interrogating the agents of managed devices and determining traffic data from ports connected to those devices third program step; Is this the first iteration? If no, go to fourth program step. If yes, go to fifth program step.

fourth program step; Use stored ifInOctets and ifOutOctets values from previous iterations to calculate ifInOctets and ifOutOctets delta values for this sample period and store these.

fifth program step; Store current ifInOctets and ifOutOctets values for all devices.

sixth program step; Are there more sampling periods? If yes, return to second program step. If no, go to seventh program step.

seventh program step; Calculate mean ifInOctets and ifOutOctets values for each device, averaging across all sampling periods and store.

eighth program step; Sort results into ascending order and calculate $2^{nd}$ and $3^{rd}$ derivative values.

ninth program step; Store all points where second derivative is zero and third derivative is less than zero.

tenth program step; Were any points found? If no, go to eleventh program step. If yes, go to twelfth program step.

eleventh program step; Use a sensitivity setting to determine which devices to regard as exhibiting server-like behaviour and go to thirteenth program step.

twelfth program step; Use a sensitivity setting to determine which of the points to use as a cut-off point, regard all devices in the ordered ratio graph beyond this point as exhibiting server-like behaviour, and go to thirteenth program step.

thirteenth program step; End

According to a third aspect, the present invention provides network apparatus for detection of server-like devices within a network, said apparatus comprising means for determining the ingress to egress network traffic ratio for at least some of the devices, and means for selecting the server-like devices on the basis of said determined ratios or a figure derived from said determined ratios.

BRIEF DESCRIPTION OF THE DRAWINGS

A preferred embodiment of the invention will now be described by way of example only and with reference to the accompanying drawings in which.

GLOSSARY

SNMP—Simple Network Management Protocol, application layer protocol for exchange of information between network devices and network management applications Server—A computer or device on a network which provides network or application services.

Client—A device (such as a workstation) on a network which uses services provided by server(s)

Client/server—network architecture in which clients use network resources provided by servers Server-like behaviour—behaviour exhibited by a network device indicating that it may be managing network resources Network traffic profile—characteristic data flow(s) exhibited by a network device MIB—Management Information Base, a database of objects on a network device which may be monitored by a network management system ifInOctets—total number of octets received on a given interface (including framing characters) of a managed network device (32 bit counter), available from the MIB-II MIB (see RFC 1213)

ifOutOctets—total number of octets transmitted from a given interface (including framing characters) of a managed network device (32 bit counter), available from the MIB-II MIB (see RFC 1213)

DESCRIPTION OF THE PREFERRED EMBODIMENTS

Figure 1:
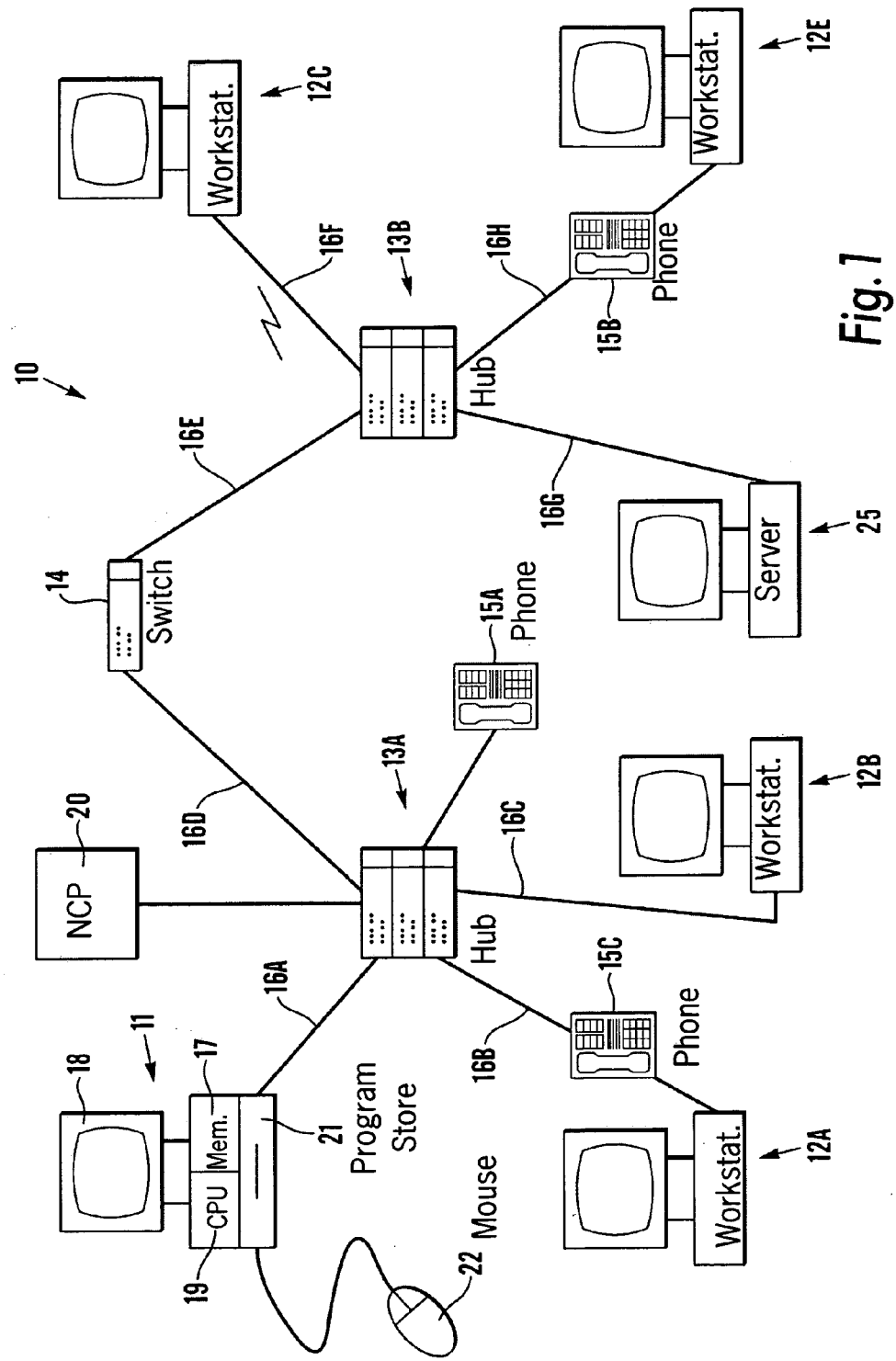
FIG. 1 is a diagrammatic view of a network to which the invention may be applied.

Referring to FIG. 1 there is shown a physical network 10 comprising a plurality of devices in the form of a network manager's workstation or computer 11, other workstations 12A,B,C,E, hubs 13A, 13B, switch 14, Ethernet phones 15A–C, phone 15A being directly connected to hub 13A, and phone 15B, 15C being connected between hub 13B and workstation 12E and between hub 13A and workstation 12A respectively, a network call processor (NCP) 20 which operates the telephones 15 over the network and a server 25. The network is a simple network and is set out for purposes of illustration only. Other configurations and arrangements may be used.

The devices are connected together by means of links 16A–H which may be hard wired and utilise any desired protocol, and link 16F which is a wireless link.

The network manager's workstation includes, in addition to a visual display unit 18, a central processing unit or signal processor 19, a selector which may be in the form of a mouse 22, a program store 21 which may comprise, for example, a CD drive, a floppy disk drive or a zip drive, and a memory 17 for storing a program which may have been loaded from the program store 21 or downloaded for example via Internet from a website.

To discover the network, using a protocol such as SNMP, the network manager's computer 11 interrogates each device and analyses the network, and stores in the memory 17 the information relating to the devices within the network and the links between the devices. In essence, many devices include a so-called agent which stores information about the device such as its unique MAC number, its SysObjectID (which identifies what the device is and what model type it is), how many ports it has and how they are connected, and the MAC address of the origin of the data which at least some of the ports have received and hence to which they are directly or indirectly connected. The agent also provides to the network manager's computer not only details of the addresses of the traffic passing through but the amount and time of the traffic. The computer 11 interrogates the agents of each device to obtain the said information.

Thus the network manager's computer is able to build up details of the traffic flows both through each switch or hub but also generally through the network.

In a preferred arrangement, the computer 11 may, on command from the selector 22, process signals from the memory 17 by the signal processor 19 and provide on the visual display unit 18 a network map showing each of the devices and the links therebetween. In the examples shown, the network is simple but of course in many instances the network will be considerably more complex and it may be necessary to arrange that the visual display unit 18 only shows a simplified version or only part of the network at any one time.

As already referred to, the preferred embodiment of the invention identifies servers or server like devices by means of an analysis of the network traffic. Due to the nature of the network traffic involved in typical client/server communications, the network traffic profiles of servers will differ significantly from those of workstations, and it is therefore possible to differentiate between the two by performing quantitative analysis of network traffic statistics.

In simple terms, most workstations send out only a limited amount of traffic (which will be input by the user and typically is passing limited information to a program on a server ) and receive a lot more traffic in response (e.g. a workstation sends a small query to a database server and receives a large table of data in return ). On the other hand, a server-like device is likely to send out a considerable amount of traffic to for example workstations but only receive a limited amount of traffic in the form of requests from workstations. This explanation is simplistic and ignores many other forms of traffic but enables the principle to be understood.

Thus as it is likely that the server-like devices which we wish to detect will have greater overall network traffic throughput than other devices on the network (at least over a sensible period of time to discount local traffic peaks), this gives us the basis to identify them, within a given network. Thus for example, if we know that there are 'n' servers in a network, then it is possible to arrange for the devices to be ranked in terms of their relevant traffic flows and then identify those n with the highest relevant traffic flow and hence identify the servers.

On the other hand, a more useful automated detection technique should be capable of functioning with no prior knowledge of the number or proportion of such server-like devices within the network, and in this case merely analysing all network traffic over a given period of time, ranking the devices in terms of the traffic received or sent by the device and identifying those 'n' devices with the highest relevant traffic flow is not a viable solution.

Thus preferably the method of the invention incorporates a more universal means of identifying server-like devices by a more detailed analysis of the difference in network traffic profiles between such devices and other network devices.

Typical differences between network traffic profiles of servers and workstations in a client/server environment may be as follows.

In a typical client/server environment it is reasonable to assume that there will be a few-to-many server to client ratio, and that a given server will regularly receive data from many sources, and send data out to many recipients. It is also likely that the number of servers used by the average workstation will be lower than the number of workstations serviced by the average server. With the nature of client/server communication, i.e. requests initiated from each client resulting in, typically larger responses from the target server (see FIG. 2), it is reasonable to assume that the ratio of outbound to inbound traffic will be greater for the average server-like device than it is for the average workstation.

Figure 2:
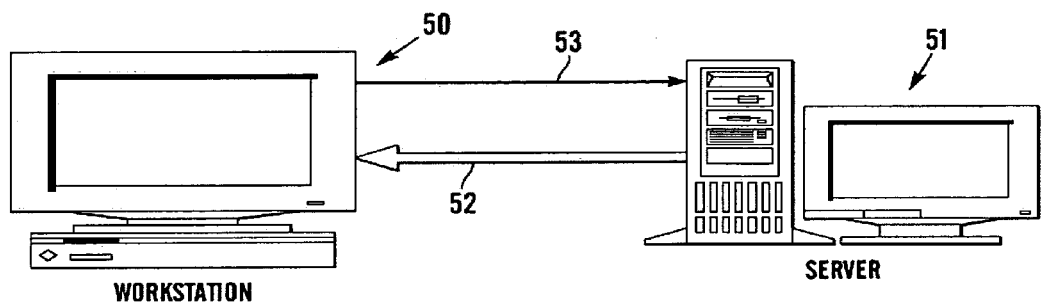
FIG. 2 is a representation of typical data flows between a server-like device and one of its clients.

FIG. 2 shows a part of a network such as that illustrated in FIG. 1. There is shown a client (workstation) 50, and a server 51, the arrows 52,53 illustrating the flow of traffic between them and the thickness of the arrow being a measure of the traffic flowing in that particular direction. Thus FIG. 2 shows the relative traffic flows between the server 51 and the single workstation, more traffic flowing from the server to the workstation (arrow 52) than vice versa (arrow 53). The relative thicknesses of the arrows in each direction in respect of a particular link enables one to see the ingress to egress network traffic ratios. It will be clear that the server ingress:egress ratio is lower than workstation ingress:egress ratio (in the single client/single server case they are, of course, reciprocals of each other) and the relative ratios would be similar for each of any number of workstations connected to the server 51.

Figure 3:
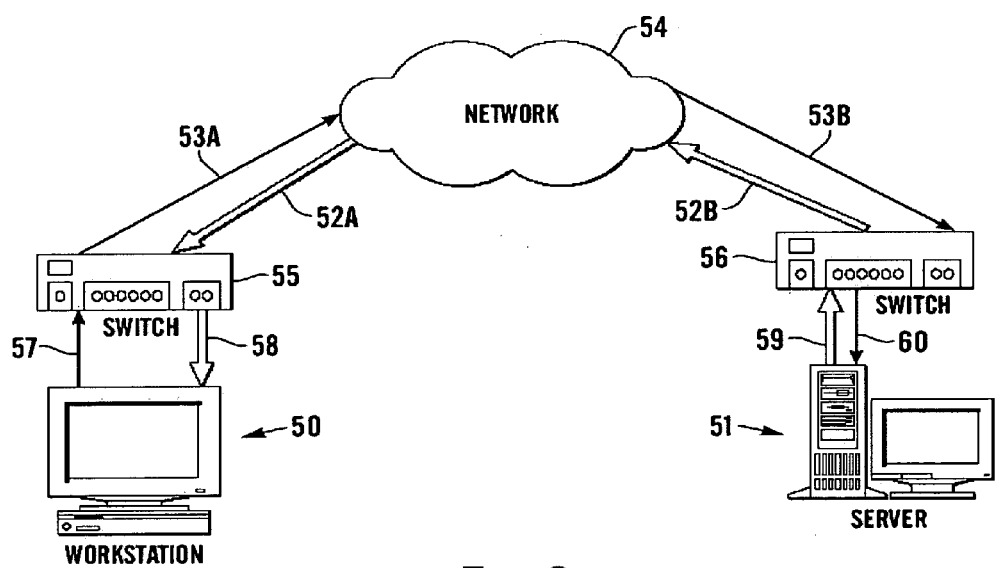
FIG. 3 is a representation of relative traffic flows involved in a single client/server communication phase, including the switches to which each are attached.

This information is, however, of limited availability, as the required network traffic statistics are generally not readily available as the majority of servers and workstations do not have a MIB from which the required statistical traffic data can be obtained via SNMP. In order to obtain and make use of this traffic information we require access to network devices from which network traffic statistics are readily available and where such traffic statistics relate directly to the servers and workstations involved. For this purpose we can obtain and analyse the ingress and egress traffic statistics on the switch ports to which the servers and workstations are attached the port connection information having been obtained in any case when interrogating the network to derive the map of the network. A representation of the data flows involved is shown in FIG. 3 which shows the server 51 and workstation 50 each connected to the remainder of the network 54 by respective ports of respective managed switches 55, 56. Arrows 53A and 52A illustrate the traffic between the port of switch 55 and the network 54. Arrows 53B and 52B illustrate the traffic between the port of switch 56 and the network 54. Arrows 58 and 57 illustrate the traffic between the port of switch 55 and the workstation 50. Arrows 59 and 60 illustrate the traffic between the port of switch 56 and the server 51. As before, the thickness of the arrows is a measure of the network traffic in that particular direction.

As can be seen from FIG. 3, the relationship between server and client ingress/egress traffic ratios is the reverse of the relationship between server switch port and client switch port ingress/egress traffic, i.e. the port on a switch to which a server is attached is likely to have a higher ingress:egress traffic ratio than that of the port on a switch to which a workstation is attached.

The ingress and egress traffic statistics for each port on each switch can be obtained from the agent on the relevant switch via the MIB (MIB-II see RFC 1213) using SNMP, and this gives us a method of implementing this method of the invention, since we can readily determine the switches and ports involved, and can perform SNMP communications with each switch.

We now set out the steps required to analyse the traffic data to facilitate an automated server detection procedure. Given that a high ratio of ifInOctets:ifOutOctets is an indicator of server like behaviour, and indeed that the ratios for all servers, whilst not identical, are likely be distinctly different from other devices, if the ingress:egress ratio values for each sampled device are plotted from left to right in ascending order, we can expect the servers to appear towards the right of the graph. In addition, we have found that rather than there being a smooth increase in ratio value across the dataset, there will be a distinct jump in value at a cut-off point, the cut-off point defining a point on the graph above which devices are exhibiting server-like behaviour. In short, the graph will be an approximate sigmoid curve, as shown in FIG. 4.

Figure 4:
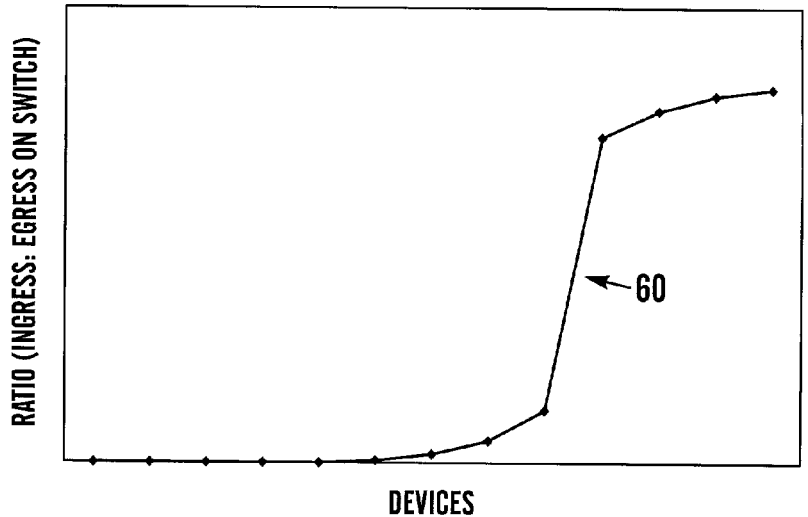
FIG. 4 is a sigmoid curve like graph of network traffic ingress/egress ratio for a number of network devices.

FIG. 4 is a plot of devices (ordered in respect of their ingress-egress traffic ratios) against their ingress-egress traffic ratios. The graph in FIG. 4 can be seen as representative of two distinct groups of devices or populations, with the separation point indicated by a sudden sharp increase in the ratio value (at 60). This example is a simplified analysis, which assumes a single distinct separation point between the groups or populations.

In practical data sets there will be multiple points where there is a sudden sharp increase in ratio value because other types of devices will have ratio values which are similar to each other but are distinctly different to other devices. For example, different types of servers (e.g. servers dealing with internet, servers holding word processing programs, servers holding particular types of databases) may have distinctly different ratios.

Figure 5:
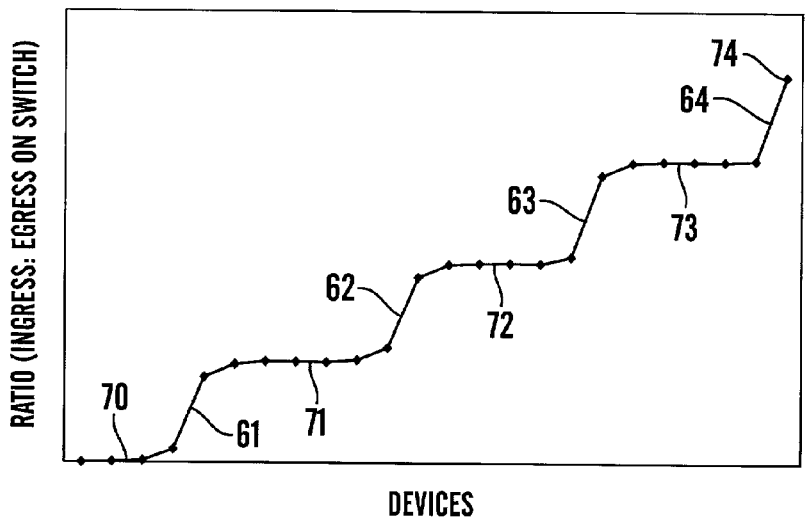
FIG. 5 is a graph similar to FIG. 4 but for a network containing many different types of device providing four potential cut-off points.

This is shown in FIG. 5, which is a similar graph to FIG. 4 but for more devices of more different types. Points 61, 62, 63, 64 at which there are sudden sharp increases in the ratio and which define the boundaries between devices of different types can be determined using differential calculus. For a given ordered data set illustrated in FIG. 5, sharp upward trends in the original dataset are located where:

$$\frac{d^2y}{dx^2} = 0, \text{ (second derivative)}$$

$$\frac{d^3y}{dx^3} < 0, \text{ (third derivative)}$$

where y is the ranked devices and x is the ingress:egress network traffic ratio.

Figure 6:
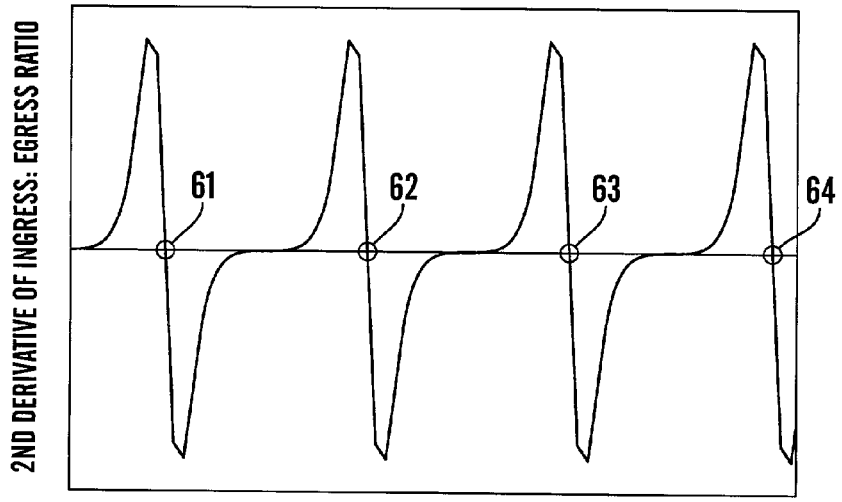
FIG. 6 is a graph of the 2nd derivative of the graph of FIG. 5.

FIG. 6 is a graph of the second derivative $$\frac{d^2y}{dx^2}.$$

The points 61–64 appear on the second derivative graph where the x-axis is cut $$\left(\frac{d^2y}{dx^2} = 0\right)$$

and the gradient is negative $$\left(\frac{d^3y}{dx^3} < 0\right).$$

If we assume that a given graph has 'm' such potential cut-off points (see FIG. 5), the third derivative graph will dip below the x-axis at m points corresponding to points 61–64.

The points 61–64 divide the devices into groups of different types of device, the groups being numbered 70–74 in the FIG. 5. The group or groups of devices with the highest ratios e.g. groups 74 or groups 74 and 75, or groups 74, 73, 72 are most likely to be server-like devices.

We have thus determined the location of the points on 61–64. One of these points 61–64 will be the so-called cut-off point above which all devices are (or are likely to be) servers. We need to establish which of the points 61–64 is the correct cut-off point. Thus the points 61–64 indicate potential cut-off points. If point 64 is the cut-off point, then devices in the group 74 alone are servers. If point 63 is the cut-off point, then devices in groups 74 and 73 are servers. If point 62 is the cut-off point, then devices in groups 74, 73, and 72 are servers.

Each of these points 61–64 is therefore a potential cut-off point, and to determine which point is the cut-off we use a "precision setting". At higher levels of precision (i.e. where we wish to be more certain that all devices above a selected cut-off point are, indeed, servers) higher cut-off points are used; i.e. the identified servers are those whose ingress: egress ratio are more significantly higher than the rest of the population. Thus in FIG. 5, if we select point 64 as the cut-off, then we have selected only one device as a server. We can be more certain that this device is a server, but it is likely that some servers (i.e. those in group 73) are being ignored. By adjusting the precision setting (i.e. by selecting a different point as the cut-off) a more accurate insight into which devices are exhibiting server like behaviour can be gained.

The ratio values obtained from target devices have to be sampled across time (i.e. by obtaining values for consecutive equal time intervals and then averaging these). The longer the time period across which average values are obtained, the more likely it is that the evaluation of which devices are exhibiting server-like behaviour will be accurate, however good results can be obtained with a fairly short evaluation period, e.g. sampling for 5 minutes with a 1 minute sample time, and taking the average of the 5 results obtained.

We have described how the network may be supervised. The preferred method of the invention is carried out under the control of the network manager's workstation or computer and in particular by means of a program controlling the processor apparatus of that computer or elsewhere in the system.

The program for controlling the operation of the invention may be provided on a computer readable medium, such as a CD, or a floppy disk, or a zip drive disk carrying the program or their equivalent, or may be provided on a computer or computer memory carrying the website of, for example, the supplier of the network products. The program may be downloaded from whichever appropriate source and used to control the processor to carry out the steps of the invention as described.

Figure 7:
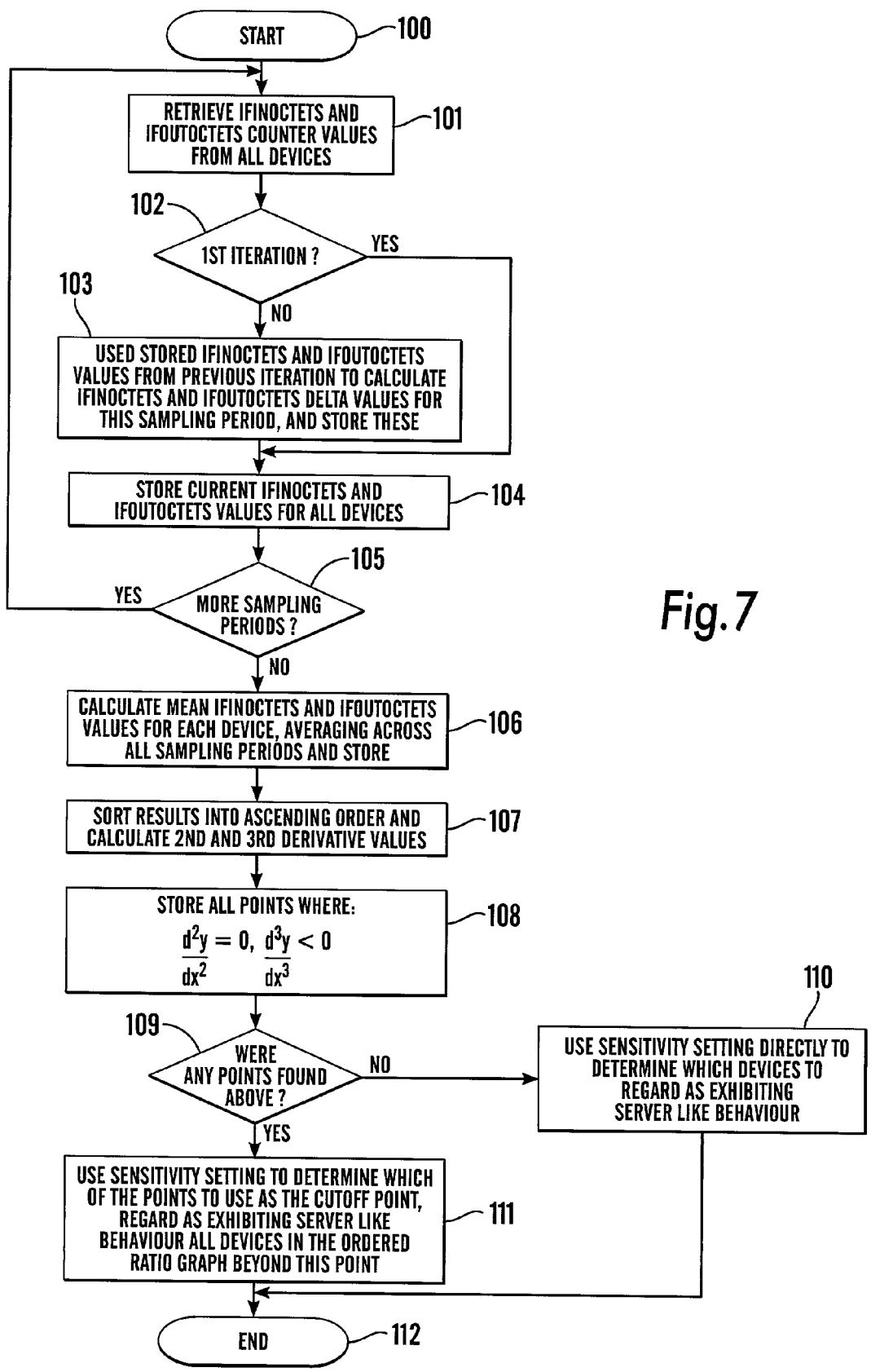
FIG. 7 is a flowchart of the method of the invention for detecting servers.

FIG. 7 is a flowchart showing the program steps:

Program step 100; Start

Program step 101; Retrieve ifInOctets and ifOutOctets counter values from all devices (e.g. by interrogating the agents of managed devices and determining traffic data from ports connected to those devices)

Program step 102; Is this the first iteration? If no, go to program step 103. If yes, go to program step 104.

Program step 103; Use stored ifInOctets and ifOutOctets values from previous iterations to calculate ifInOctets and ifOutOctets delta values for this sample period and store these.

Program step 104; Store current ifInOctets and ifOutOctets values for all devices.

Program step 105; Are there more sampling periods? If yes, return to program step 101. If no, go to program step 106.

Program step 106; Calculate mean ifInOctets and ifOutOctets values for each device, averaging across all sampling periods and store.

Program step 107; Sort results into ascending order and calculate 2$^{nd}$ $$\left(\frac{d^2 y}{dx^2}\right)$$

and 3$^{rd}$ $$\left(\frac{d^3 y}{dx^3}\right)$$

derivative values.

Program step 108; Store all points where $$\frac{d^2 y}{dx^2} = 0, \text{ and } \frac{d^3 y}{dx^3} < 0.$$

Program step 109; Were any points found? If no, go to program step 110. If yes, go to program step 111.

Program step 110; Use sensitivity setting to determine which devices to regard as exhibiting server-like behaviour and go to program step 112.

Program step 111; Use sensitivity setting to determine which of the points to use as a cut-off point, regard all devices in the ordered ratio graph (i.e. FIG. 5) beyond this point as exhibiting server-like behaviour, and go to program step 112.

Program step 112; End

The invention is not restricted to the details of the foregoing example.

The invention claimed is:

1. A method for detection of server-like devices within a network, said detection method comprising the steps of
    determining a respective ingress to egress network traffic ratio for at least some of the devices,
    and selecting the server-like devices on the basis of each determined ratio or a figure derived from each determined ratios,
    wherein selecting the server-like devices includes selecting those devices having a value of said determined ratio above a selected value,
    said selected value providing a cut-off point beyond which all device are considered as exhibiting server-like behavior.

2. A method as claimed in claim 1 in which each server-like device is connected to a port of another device and the ingress to egress network traffic ratio is determined by determining network traffic through said port.

3. A method as claimed in claim 2 in which said network traffic through said port is determined using SNMP.

4. A method as claimed in claim 1 including the step of ranking the devices in order of their determined ratios.

5. A method as claimed in claim 4 in which the selection of the server-like devices includes determining discontinuities in the values of the determined ratios of the ranked devices.

6. A method as claimed in claim 4 including the step of nominally plotting the determined ratios of the devices against the ranked devices and deriving a second derivative of a resulting ordered ratio graph, and using the second derivative to select the server-like devices.

7. A method as claimed in claim 5 including the step of nominally plotting the determined ratios of the devices against the ranked devices and deriving a third derivative of a resulting ordered ratio graph, and using second and third derivatives to select the server-like devices.

8. A method as claimed in claim 7 including the step of using the second and third derivatives to divide the devices into groups and selecting one or more of the groups of devices as server-like devices.

9. A method as claimed in claim 8 in which devices are divided into groups by determining boundaries of the groups as points where the second derivative is zero and the third derivative is less than zero.

10. A computer program on a computer readable medium loadable into a digital computer, said computer program comprising software for performing the steps of claim 1.

11. Network apparatus for detection of server-like devices within a network, said apparatus comprising means for determining a respective ingress to egress network traffic ratio for at least some of the devices, and means for selecting the server-like devices on the basis of each determined ratio or a figure derived from each determined ratio, said selecting means including means for selecting those devices having a value of said determined ratio above a selected value, said selected value providing a cut-off point beyond which all devices are considered as exhibiting server-like behavior.

12. Apparatus as claimed in claim 11 in which each server-like device is connected to a port of another device and the ingress to egress network traffic ratio is determined by determining network traffic through said port.

13. Apparatus as claimed in claim 12 in which said network traffic through said port is determined using SNMP.

14. Apparatus as claimed in claim 11 including means for ranking the devices in order of their determined ratios.

15. Apparatus as claimed in claim 14 including means for determining discontinuities in the values of the determined ratios of the ranked devices.

16. Apparatus as claimed in claim 14 including means for nominally plotting the determined ratios of the devices against the ranked devices and deriving a second derivative of a resulting ordered ratio graph, and means for using the second derivative to select the server-like devices.

17. Apparatus as claimed in claim 15 including means for nominally plotting the determined ratios of the devices against the ranked devices and deriving a third derivative of a resulting ordered ratio graph, and means for using second and third derivatives to select the server-like devices.

18. Apparatus as claimed in claim 17 including means for using second and third derivatives to divide the devices into groups and selecting one or more of the groups of devices as server-like devices.

19. Apparatus as claimed in claim 18 including means for dividing the devices into groups by determining boundaries of the groups as points where the second derivative is zero and the third derivative is less than zero.

* * * * *